C. W. FOLSOM.
THEFT INDICATING MECHANISM FOR MOTOR VEHICLES.
APPLICATION FILED FEB. 24, 1917.
1,239,780.
Patented Sept. 11, 1917.
2 SHEETS—SHEET 1.
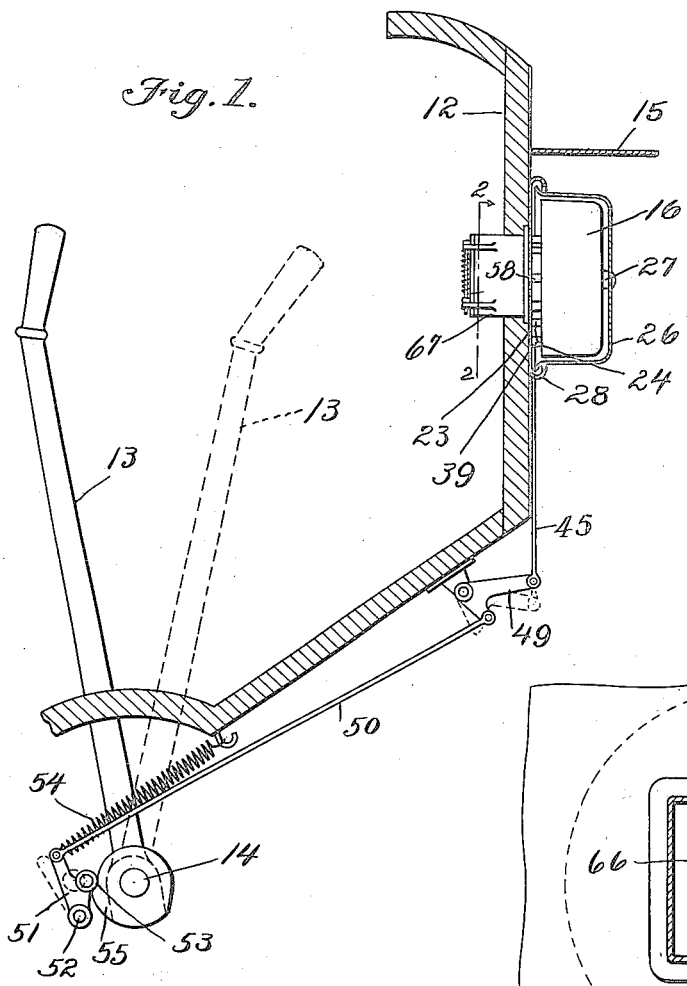
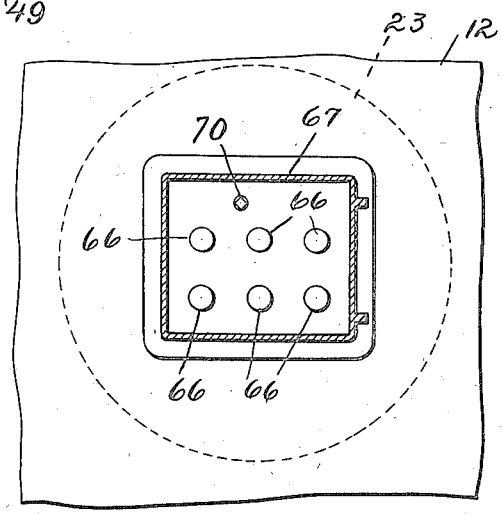
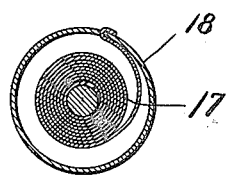
Inventor.
Charles Walter Folsom
by Wright Brown Quinby May.
Att'ys.

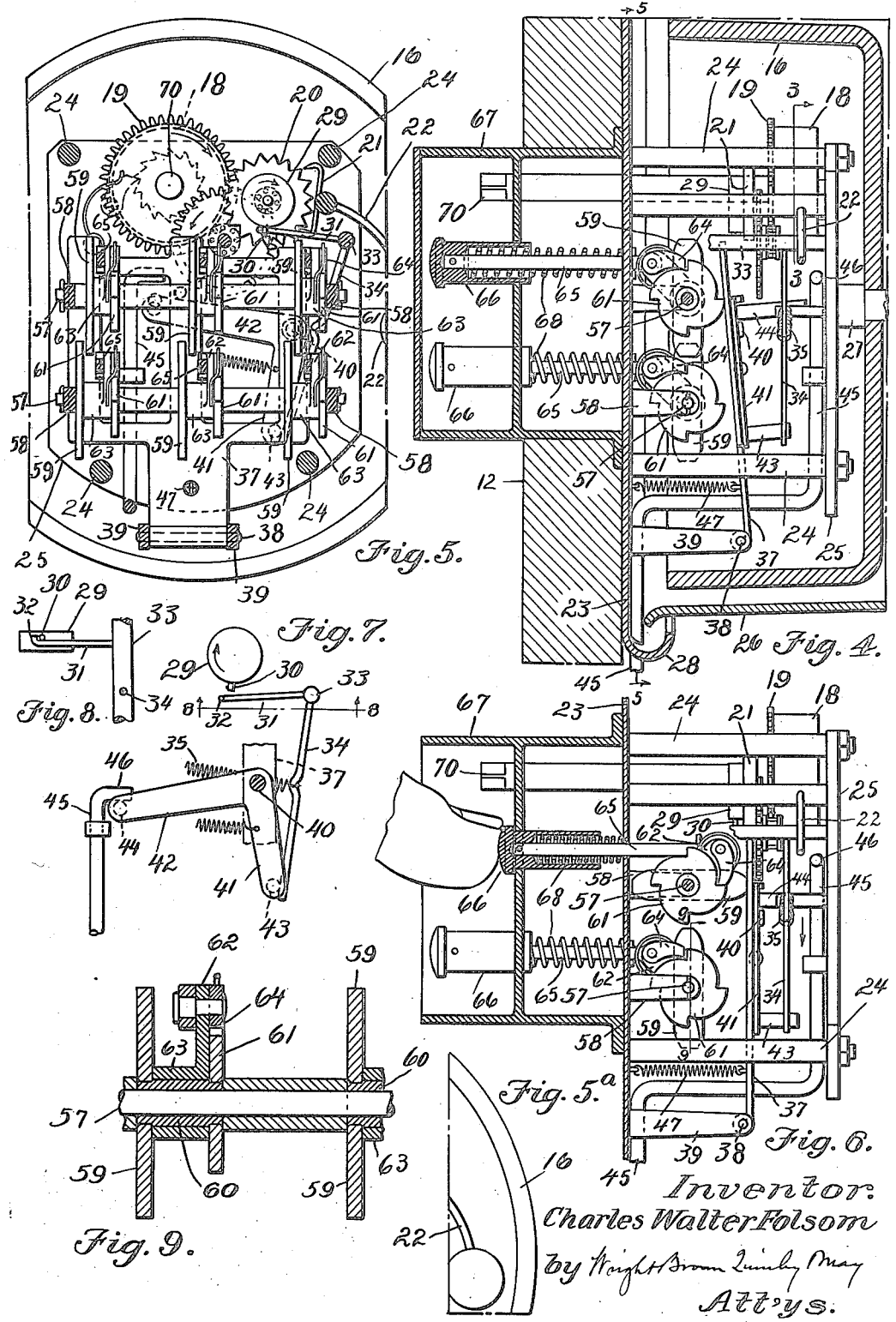

UNITED STATES PATENT OFFICE.

CHARLES WALTER FOLSOM, OF CAMBRIDGE, MASSACHUSETTS.

THEFT-INDICATING MECHANISM FOR MOTOR-VEHICLES.

1,239,780. Specification of Letters Patent. Patented Sept. 11, 1917.

Application filed February 24, 1917. Serial No. 150,739.

*To all whom it may concern:*

Be it known that I, CHARLES WALTER FOLSOM, a citizen of the United States, residing at Cambridge, in the county of Middlesex and State of Massachusetts, have invented new and useful Improvements in Theft-Indicating Mechanism for Motor-Vehicles, of which the following is a specification.

This invention has for its object to provide means applicable to a motor vehicle and adapted to sound an alarm whenever the vehicle is started, unless the starter observes certain precautions, or performs a certain operation, rendering the alarm inoperative.

The invention is embodied in alarm mechanism, organized as hereinafter described, and adapted to prevent the unauthorized starting of a vehicle without giving an alarm, the mechanism being also adapted to be rendered inoperative by the owner of the vehicle and to be set or adjusted by the owner before leaving the vehicle, in such manner that, while the owner is enabled to start the vehicle without operating the alarm, it is practically impossible for one not knowing how the owner set or adjusted the mechanism to start the vehicle without operating the alarm.

Of the accompanying drawings forming a part of this specification,—

Figure 1 is a vertical section through the dash and a portion of the floor of a motor vehicle equipped with theft-indicating mechanism embodying the invention, said mechanism being shown in elevation.

Fig. 2 is a section on line 2—2 of Fig. 1, and an elevation of parts at the right of said line.

Fig. 3 is a section on the plane of line 3—3 of Fig. 4, showing the spring and barrel of the motor.

Fig. 4 is an enlargement of a portion of Fig. 1, showing in section the parts shown in elevation in Fig. 1.

Fig. 5 is a section on line 5—5 of Fig. 4, and an elevation of parts at the right of said line.

Fig. 5ᵃ is a continuation of a portion of Fig. 5.

Fig. 6 is a view similar to Fig. 4, illustrating the operation.

Fig. 7 is a fragmentary elevation, illustrating under different conditions parts shown by Fig. 5.

Fig. 8 is a section on line 8—8 of Fig. 7, and a bottom view of parts above said line.

Fig. 9 is a section on line 9—9 of Fig. 6.

The same reference characters indicate the same or similar parts in all the figures.

In the drawings, 12 represents the dash of a motor vehicle and 13 represents a movable member forming an element of vehicle-starting and stopping means, said member as here shown, being a lever attached to a rock-shaft 14 below the floor of the vehicle body. Said lever may be either of the levers commonly used to control the vehicle, and may be, for example, the brake-lever. When the lever is in the full line position shown by Fig. 1, it coöperates with other mechanism to prevent the starting of the vehicle, and when it is moved to the dotted line position in Fig. 1, it starts, or permits the starting of the vehicle. It may be assumed that the lever 13 is a brake-lever, although it may be any lever or movable member adapted to perform the functions above indicated.

Mounted on the front side of the dash 12, and in position to be closed and protected by the radiator casing 15, or other fixed part, is a casing containing an audible signal, which may be a bell or gong 16, and a motor whereby said signal may be operated, said motor being preferably inclosed in the gong and driven by the spring 17 (Fig. 3) inclosed in a barrel 18, carrying a gear 19 forming part of a spring-driven train. Said train, as here shown, includes a star wheel 20, which coöperates with an anchor escapement 21 in oscillating the gong hammer 22.

It will be understood that any other suitable types of audible signal and motor may be substituted for those here illustrated.

The above-mentioned casing, as here shown, includes a base plate 23, which may be attached by screws, or otherwise, to the dash 12, and is provided with standards 24 forming parts of a supporting frame which includes a frame member 25, attached to said standards, the base 23 and member 25 containing bearings for the shafts or arbors of the motor train. The casing also preferably includes a cover or inclosing portion 26, formed to inclose the gong and centrally supported by a stud 27 attached to the frame member 25. The inclosing member 26 is spaced from the gong and from the base plate 23 as shown by Figs. 1 and 4, the base plate being preferably provided with a rolled lip or flange 28, permitting the outward passage of sound waves, and preventing the insertion of an instrumentality intended to contact with the gong and deaden the sound thereof.

The motor train includes a rotary member 29 having a pin or projection 30, adapted to coöperate with a movable detent, whereby the motor may be restrained from operating. Said detent preferably includes an arm 31 provided with a hook or bent end 32 (Fig. 8), and attached to a rock-shaft 33 journaled in bearings in the base plate 23 and frame member 25. Said rock-shaft is provided with an arm 34 engaged by a spring 35 which normally holds the detent 31 in engagement with the projection 30, thus restraining the motor.

37 represents a part which I call a carrier, which is a flat-sided frame or plate pivoted at 38 to ears 39 attached to the base plate 23. To said carrier is pivoted at 40 a bell-crank lever composed of arms 41 and 42, the arm 41 having a stud 43 adapted to engage the arm 34 connected with the detent. The arm 42 has a pin or stud 44 adapted to engage a hooked member 45 forming a part of means connecting the controlling member or lever 13 with the detent 31.

The stud 44 and the hooked or bent end 46 of the member 45 are hereinafter referred to as coupling parts, which are normally separated, as shown by Fig. 4, by means of a spring 47 which normally holds the carrier 37 in the inclined position shown by Fig. 4, and permits it to assume the vertical position shown by Fig. 6. For identification I call the part 46 the primary coupling part and the part 44 the secondary coupling part.

The member 45 of the above-described connecting means is a rod bent as indicated by Figs. 4 and 5, and passing through an orifice in the flange 28, the upper portion of said rod being inclosed in the gong and casing, and its lower portion projecting downwardly, below the dash 12, where it is connected with one arm of the bell-crank lever 49, forming another element of said connecting means. The lever 49 is connected by a rod 50 with a lever 51 fulcrumed at 52 and having a trundle roll 53, which is held by the spring 54 against the perimeter of a cam 55 attached to the rock-shaft 14.

When the carrier 37 and secondary coupling part 44 occupy the positions shown by Fig. 6, the coupling part 44 is in the path of the primary coupling part 46, so that when the latter is moved in the direction of the arrow (Fig. 6) the primary coupling part 46 engages the secondary coupling part 44, as indicated by Fig. 7, moving the bell-crank levers 41, 42 in the direction required to disengage the detent 31 from the projection 30 and permit the operation of the motor.

To shift the position of the carrier 37 and coupling part 44 from their normal positions to the position shown by Fig. 6, I provide the means next described.

Mounted to rotate on fixed parallel studs 57 which are supported by ears 58 on the base plate, are a plurality of carrier-displacing and releasing cams 59, each of which is adapted, when turned to a horizontal position, as indicated at the upper portion of Fig. 6, to bear on and displace the carrier 37, and thus force the secondary coupling part 44 into the path of the primary coupling part 46. When the cam is in the vertical position, indicated by Fig. 4 and at the lower portion of Fig. 6, it is out of the path of the carrier 37 and permits said carrier to be drawn by the spring 47 to the position shown by Fig. 4, the secondary coupling part 44 being out of the path of the primary coupling part 46.

Each cam 59 is adapted to be rotated step by step by the means next described.

Each cam is attached to one end of a sleeve or hub 60 (Fig. 9) adapted to rotate on a stud 57, the other end of said hub being provided with a rigidly attached ratchet 61. Oscillatory arms 62, the hubs 63 of which rotate loosely on the hubs 60, carry pivoted spring-pressed pawls 64 engaging the ratchets 61. With the ratchet-carrying arms 62 are pivotally connected the shanks 65 of push pieces 66, adapted to slide in guides in a housing 67 attached to the base plate 23 and projecting through the dash 12. Said push pieces are normally retracted by springs 68, and hold the cams 59 through the intermediate connections in their vertical carrier-releasing position. When either of the push pieces 66 is projected, the corresponding cam 59 is moved to and left in position to displace the carrier 37, the push piece being immediately retracted by its spring when pressure is removed. This operation is performed by the owner of the vehicle before leaving it, and sets the mechanism so that when the lever 13 is moved to start the vehicle, the clutch parts 44 and 46 are interengaged and displace the detent 31, unless, before moving the lever, the operator again projects the same push piece, and thus returns the cam connected therewith to its inoperative vertical position and permits the carrier to withdraw the clutch part 44 from the path of the clutch part 46. When this is done, the indicating mechanism is rendered inoperative, so that the starting of the vehicle is not attended by an alarm. There being several push pieces (six, as here shown), and all being normally retracted, the chances are largely against the selection and manipulation of the proper push piece by a thief. The push pieces, or keys as they are called hereinafter, are identical with each other, and the identity of each is concealed by its automatic retraction, which immediately follows its cam-rotating and setting projection. The owner may set the mechanism by projecting more than one key, and thus increase the difficulty of the problem confronting a thief.

It will now be seen that the owner, or authorized user of the vehicle, may set the indicating mechanism for action as a whole, before leaving the vehicle, by projecting either key, or any desired number of keys, and may render the said mechanism inoperative before again starting the vehicle, by again projecting the same key, or keys, the projection of any other key setting another cam in its carrier-displacing position, and being therefore ineffective to render the mechanism inoperative.

An unauthorized user can start the vehicle, without giving an alarm, only by projecting the particular key, or keys, last projected by the owner, and if he projects any other key, an alarm is given when the lever 13 is moved to starting position.

The motor-restraining and releasing detent may properly be considered as including the hooked arm 32, the rock-shaft 33, and the rock-shaft arm 34.

The rod 45 having the acting portion 46, constitutes, in effect, a coupling part, the acting portion of which is movable in a fixed path, the complemental acting portion or stud 44 constituting a shiftable coupling part which is movable into and out of said path. The said rod 45, its acting portion 46, and the shiftable coupling part 44, constitute elements of normally inoperative alarm-releasing and restraining mechanism, while the controlling member 13 and the parts designated by the numerals 49 to 55, inclusive, constitute complemental elements completing said mechanism.

The keys 66 and the parts coöperating therewith in shifting the position of the coupling part 44 constitute a selective means for successively setting said alarm-releasing and restraining mechanism and rendering it inoperative. The motor spring may be wound by a key engaged with a winding post 70 projecting into the housing 67.

As implied in the foregoing description and in the following claims, I am not limited to the specific mechanism of the preferred embodiment of my improvements shown by the drawings, except as otherwise required in certain of the more limited claims.

I claim:

1. Theft-indicating mechanism for motor vehicles, comprising, in combination, an audible signal, a signal-operating motor, a motor-restraining detent, a movable vehicle-controlling member, normally inoperative connecting means between said member and detent, adapted when operative, to cause the release of the motor by a vehicle-starting movement of said member, and selective means whereby the mechanism may be alternately set for action and rendered inoperative, said means including a plurality of identical spring-retracted keys, each adapted to be manually projected, and each normally maintained in identity-concealing position.

2. Theft-indicating mechanism for motor vehicles, comprising, in combination, an audible signal, a signal-operating motor, a motor-restraining detent, a movable vehicle-controlling member, connecting means between said controlling member and detent, whereby the detent may be displaced by a vehicle-starting movement of said member to release the motor, said connecting means including coupling parts normally separated to render said means inoperative, and selective means having provisions for rendering said coupling parts operative, after the vehicle is stopped, and inoperative before the vehicle is again started, whereby an authorized user may set the indicating mechanism for action before leaving the vehicle, and render said mechanism inoperative before again starting the vehicle, said selective means including a plurality of identical spring-retracted keys, either of which is adapted, by successive projections, to set said mechanism for action and render the mechanism inoperative, and is automatically retracted, after each projection, to conceal its identity.

3. Theft-indicating mechanism for motor vehicles, comprising, in combination, an audible signal, a signal-operating motor, a motor-restraining detent, a vehicle-controlling member, connecting means between said controlling member and detent, whereby the detent may be displaced by a vehicle-starting movement of said member to release the motor, said connecting means including a coupling part movable in a fixed path, and a shiftable coupling part movable into and out of said path, and selective means for moving said shiftable part, said means including a spring-pressed carrier supporting said shiftable part and normally holding it out of said path, a plurality of identical spring-retracted keys, each adapted to be manually projected, and each normally maintained in identity-concealing position, and means operable by the projection of either key to confine said shiftable part in said path.

4. Theft-indicating mechanism for motor vehicles, comprising, in combination, an audible signal, a signal-operating motor, a motor-restraining detent, a vehicle-controlling member, connecting means between said controlling member and detent, whereby the detent may be displaced by a vehicle-starting movement of said member to release the motor, said connecting means including a coupling part movable in a fixed path, and a shiftable coupling part movable into and out of said path, and selective means for moving said shiftable part, said means including a spring-pressed carrier supporting said shiftable part and normally holding it out of said path, a plurality of carrier-displacing and releasing cams, and manually operable devices for rotating said cams independently step by step.

5. Theft-indicating mechanism for motor vehicles, comprising, in combination, an audible signal, a signal-operating motor, a motor-restraining detent, a vehicle-controlling member, connecting means between said controlling member and detent, whereby the detent may be displaced by a vehicle-starting movement of said member to release the motor, said connecting means including a coupling part movable in a fixed path, and a shiftable coupling part movable into and out of said path, and selective means for moving said shiftable part, said means including a spring-pressed carrier supporting said shiftable part and normally holding it out of said path, a plurality of carrier-displacing and releasing cams, a plurality of spring-retracted keys, and ratchet and pawl connections between said keys and cams.

6. A theft-indicating attachment for motor vehicles, comprising a case adapted for attachment to the front side of a vehicle dash and provided with a housing formed to extend through said dash, an audible signal, a signal-operating motor, and a motor-restraining detent, all inclosed in said case, means adapted to connect the detent with a vehicle-controlling member, said means including a coupling part movable in and projecting from said case, a secondary coupling part and a spring-pressed carrier therefor, also inclosed in said case, said carrier being normally held in position to render the secondary coupling part inoperative, and manually operable devices for alternately displacing and releasing said carrier, and including spring-retracted keys extending from the case into said housing, the secondary coupling part being movable by the displacement of the carrier into engagement with the primary coupling part.

7. A theft-indicating attachment for motor vehicles, as specified by claim 6, the said case being composed of spaced apart base and cover portions adapted to permit the passage of sound waves and prevent the insertion of a tampering instrumentality.

8. A theft-indicating attachment for motor vehicles, comprising a case adapted for attachment to the front side of a vehicle dash, and provided with a housing formed to extend through said dash, an audible signal supported in said case and including a gong and a hammer, a motor-supported in the case and adapted to oscillate the hammer, said motor including a rotary member having a detent-engaging projection, a detent normally engaging said projection to restrain the motor, a coupling part movable in and projecting from said case, a spring-pressed carrier also inclosed in the case, a bell-crank lever fulcrumed on said carrier and provided with a detent-displacing member and with a coupling part which is shiftable by said carrier into and out of the path of the first-mentioned coupling part, and manually operable means for alternately displacing and releasing said carrier and including a plurality of carrier-displacing and releasing cams, a plurality of spring-retracted keys projecting from the case into said housing, and ratchet and pawl connections between said cams and keys.

9. Theft-indicating mechanism for motor vehicles, comprising, in combination, a case adapted for attachment to the front side of a vehicle dash, and provided with a housing formed to extend through said dash, an audible signal, a signal-operating motor, and a motor-restraining detent, all inclosed in said case, a coupling part movable in and projecting from said case, a vehicle-controlling member spaced from the case, motion-transmitting connections between said member and coupling part, a shiftable coupling part and a spring-pressed carrier therefor, also inclosed in said case, and manually operable devices for alternately displacing and releasing said carrier, and including spring-retracted keys extending from the case into said housing.

10. A theft-indicator for motor vehicles comprising, in combination, a motor-driven alarm, a vehicle-controlling member, complemental elements forming with said member a normally inoperative alarm-releasing mechanism, and selective means for setting said mechanism for operation, said selective means including a plurality of identical spring-retracted keys, each adapted to be manually projected, and each normally maintained in identity-concealing position.

In testimony whereof I have affixed my signature.

CHARLES WALTER FOLSOM.